United States Patent
Winkler et al.

(10) Patent No.: US 7,372,172 B2
(45) Date of Patent: May 13, 2008

(54) DEVICE AND METHOD FOR THE GENERATION OF ELECTRICAL ENERGY

(75) Inventors: Stefan Winkler, Linz (AT); Günther Hess, Linz (AT); Johann Hell, Laaben (AT); Friedrich Gillmeier, Traiskirchen (AT)

(73) Assignee: VA Tech Hydro GmbH, Vienna (AT)

( * ) Notice: Subject to any disclaimer, the term of this patent is extended or adjusted under 35 U.S.C. 154(b) by 0 days.

(21) Appl. No.: 10/859,093

(22) Filed: Jun. 3, 2004

(65) Prior Publication Data

US 2004/0219015 A1 Nov. 4, 2004

Related U.S. Application Data

(63) Continuation of application No. PCT/EP02/13058, filed on Nov. 21, 2002.

(30) Foreign Application Priority Data

Dec. 7, 2001  (AT)  .................... A 1923/2001

(51) Int. Cl.
*F03B 13/00*  (2006.01)
*F03B 13/10*  (2006.01)
*H02P 9/04*  (2006.01)

(52) U.S. Cl. .......................... 290/43; 290/54

(58) Field of Classification Search ............ 290/42, 290/43, 53, 54
See application file for complete search history.

(56) References Cited

U.S. PATENT DOCUMENTS

| | | | |
|---|---|---|---|
| 2,501,696 A * | 3/1950 | Souczek ................. | 290/43 |
| 3,353,028 A | 11/1967 | Braikevitch et al. | |
| 3,535,540 A * | 10/1970 | Boulogne ............... | 290/52 |
| 4,046,403 A | 9/1977 | Yoshida | |
| 4,078,388 A * | 3/1978 | Atencio ................. | 405/78 |
| 4,102,599 A * | 7/1978 | Ziegler ................. | 415/221 |
| 4,123,666 A | 10/1978 | Miller | |
| 4,170,428 A * | 10/1979 | Atencio ................. | 405/78 |
| 4,207,015 A * | 6/1980 | Atencio ................. | 405/78 |
| 4,261,171 A * | 4/1981 | Atencio ................. | 60/398 |

(Continued)

FOREIGN PATENT DOCUMENTS

AT  408257  10/2001

(Continued)

OTHER PUBLICATIONS

English Language Abstract of JP 2001-298902.

(Continued)

*Primary Examiner*—Julio Gonzalez
(74) *Attorney, Agent, or Firm*—Nixon & Vanderhye P.C.

(57) ABSTRACT

Arrangement for generating electrical power from a flowing medium, wherein the arrangement includes a plurality of turbine generator units. At least some of the plurality of generator units are arranged at least one of one above another and one beside another. At least some of the plurality of generator units are connected to one another to form at least one module. At least one of the plurality of generator units includes a synchronous generator having permanent magnetic poles for excitation. This Abstract is not intended to define the invention disclosed in the specification, nor intended to limit the scope of the invention in any way.

49 Claims, 3 Drawing Sheets

U.S. PATENT DOCUMENTS

| | | | |
|---|---|---|---|
| 4,275,989 A * | 6/1981 | Gutierrez Atencio | 415/129 |
| 4,279,539 A * | 7/1981 | Gutierrez Atencio | 405/76 |
| 4,289,971 A * | 9/1981 | Ueda | 290/52 |
| 4,367,413 A * | 1/1983 | Nair | 290/52 |
| 4,367,890 A * | 1/1983 | Spirk | 290/52 |
| 4,464,580 A * | 8/1984 | Miller et al. | 290/52 |
| 4,468,153 A * | 8/1984 | Gutierrez Atencio | 405/78 |
| 4,613,279 A * | 9/1986 | Corren et al. | 415/121.2 |
| 4,674,279 A * | 6/1987 | Ali et al. | 60/398 |
| 4,720,640 A * | 1/1988 | Anderson et al. | 290/43 |
| 4,740,711 A * | 4/1988 | Sato et al. | 290/52 |
| 4,755,690 A | 7/1988 | Obermeyer | |
| 4,804,855 A * | 2/1989 | Obermeyer | 290/54 |
| 4,864,152 A * | 9/1989 | Pedersen | 290/53 |
| 5,440,176 A * | 8/1995 | Haining | 290/54 |
| 5,506,453 A * | 4/1996 | McCombs | 290/44 |
| 5,825,094 A * | 10/1998 | Hess | 290/54 |
| 6,011,334 A | 1/2000 | Roland | |
| 6,146,096 A * | 11/2000 | Winkler | 415/220 |
| 6,281,597 B1 * | 8/2001 | Obermeyer et al. | 290/54 |
| 6,641,327 B1 * | 11/2003 | Lassila et al. | 405/78 |
| 6,856,036 B2 * | 2/2005 | Belinsky | 290/42 |
| 7,061,135 B2 * | 6/2006 | Rammler et al. | 290/54 |

FOREIGN PATENT DOCUMENTS

| | | |
|---|---|---|
| DE | 748113 | 10/1944 |
| DE | 19623554 | 1/1998 |
| DE | 20105185 | 8/2001 |
| EP | 0977343 | 2/2000 |
| JP | 2000-213446 | 8/2000 |
| JP | 2001-298902 | 10/2001 |
| WO | 92/20134 | 11/1992 |
| WO | 01/14739 | 3/2001 |

OTHER PUBLICATIONS

English Language Abstract of JP 2000-213446.

* cited by examiner

DEVICE AND METHOD FOR THE GENERATION OF ELECTRICAL ENERGY

CROSS-REFERENCE TO RELATED APPLICATIONS

The instant application is a continuation of International Application No. PCT/EP02/13058 filed on Nov. 21, 2002 and published as International Publication WO 03/049257 on Jun. 12, 2003, the disclosure of which is hereby expressly incorporated by reference hereto in its entirety. The instant application also claims priority under 35 U.S.C. §119 of Austrian Application No. A 1923/2001 filed on Dec. 7, 2001.

BACKGROUND OF THE INVENTION

1. Field of the Invention

The present invention relates to an equipment arrangement and a method for generating electrical power from a flowing medium, for example water. The arrangement has a number of turbine generator units of which at least some are arranged one above another and/or beside one another. These units are connected to one another to form one or more modules. The invention also relates to an installation for producing electrical power and a method of rebuilding such an installation.

2. Description of the Prior Art

Equipment of the type mentioned above emerges, for example, from U.S. Pat. Nos. 4,804,855 and 4,755,690 (Obermeyer). These documents describe equipment having a large number of turbine generator units arranged one above another and beside one another and connected to form modules. They are arranged on a dam between two piers and can be raised and lowered by means of a crane. The turbine generator units are constructed in the form of so-called tube generators, in which a pear-shaped tube is provided to accommodate the generator, at whose tapering end a turbine is arranged which is connected firmly to the generator so as to rotate with it via a horizontal shaft, which is mounted in the tube. At its front, tapering end, the tube is supported by guide plates on an inlet tube surrounding the generator and the turbine.

As compared with large tubular generators in conventional power stations, the arrangement of a plurality of comparatively substantially smaller turbine generator units beside one another and one above another has the advantage of a considerably shorter structural length and, associated with this, lower investment in the infrastructure sector. They are also flexible operation. In the case of a large number of turbine generator units, there is the risk that high stresses will occur on a module as a result of the superimposition of oscillations and/or vibrations of individual units. Furthermore, in the case of a large number of turbine generator units, a comparatively high weight of the module is to be expected, which results in an appropriately strengthened crane and a corresponding infrastructure.

SUMMARY OF THE INVENTION

The present invention aims to improve the equipment already known from the prior art and, in particular, provides for an arrangement wherein the turbine generator units are simpler in constructional terms, are more compact, and more beneficial.

According to the invention, at least one generator of a turbine generator unit is constructed as a synchronous generator, in which permanent magnetic poles are provided for excitation.

Through the invention, a departure is made from the known, tried and tested concept of the electrically excited synchronous generators. A new type of generator is used which has the advantage of a particularly compact, simple and beneficial structure. When this generator type is used in a module having turbine generator units arranged beside one another and/or one above another, the result is an additional substantial advantage of a reduction in weight. This is because the electrical excitation, that is to say the exciter windings with all the required electrical parts, can be omitted. As a result, an infrastructure of smaller dimensions can be used to install such modules, and a small crane can be used for raising and lowering the modules, which has a great effect on the structural costs of an installation. However, the lack of electrical excitation also substantially simplifies the design construction, which acts directly and positively on the required overall size and on the costs of a turbine generator unit and the cooling.

An installation for generating electrical power with a dam structure, in the context of the present invention, is advantageously configured in such a way that a plurality of turbine generator units are arranged and supported beside one another. The generators of the turbine generator units are constructed as synchronous generators which have permanent magnetic poles for excitation.

Furthermore, the present invention is suitable to a particular extent for rebuilding existing installations which are predominantly provided for the at least temporary storage of water, such as sluices, in an installation for generating electrical power. In this case, the structure has at least one releasable element that can be used to store the medium, for example a weir. A module corresponding to the dimensions of the releasable element is produced within the context of the method of the invention, which module has a number of turbine generator units arranged beside one another and/or one above another, with synchronous generators with permanent magnetic excitation. If necessary, a system of raising and lowering the releasable element is matched to the weight of the module. Alternatively, it may be installed new. The releasable element is removed from the structure with the aid of the system for raising and lowering. The module with the turbine generator units is positioned in the structure, instead of or in addition to the releasable element, with the aid of the system for raising and lowering. The turbine generator units arranged in the module are connected to a power supply network via a line for carrying away the electrical power generated by the turbine generator units. If required, given at least partial outflow of the stored medium through the turbine generator units of the module, electrical power is generated. If appropriate in order to reproduce the storage function of the structure, the module is removed and replaced by the releasable element.

In operation, the turbine generator units connected to one another to form a module allow the medium to flow through them at the same time. Rotatably mounted turbine blades are used. Rotors firmly connected to the latter are also used so as to rotate with them. The rotors have permanent magnetic poles. Electrical power is generated in interaction with stators arranged concentrically around the rotors. The stators are fixed against rotation in the module and belong to and/or form part of the generators of the turbine generator units. In the event that the invention is used on a structure which is already present, the environmental aspect can be increased, since no infrastructure measures which impair the environment have to be put in place. In this way, the existing infrastructure can be used.

The permanent magnetic excitation can now be arranged either on the rotor or alternatively on the stator. Depending on the constructional stipulations and requirements, the most beneficial variants can be used.

A design variant of a turbine generator unit which can be used very advantageously is a tubular turbine generator unit. The fixing of these turbine generator units is advantageously carried out in a manner known per se such that the turbine generator units are supported on the associated frame or frame elements of the module in the area of the turbine rotor and/or in its substantially cylindrical area of the turbine housing.

The guide vanes arranged upstream in the flow direction of the turbine rotors of the turbine generator units of a module can be used at the same time to hold the turbine generator units, which results in a further constructional simplification.

Optimum efficiency is achieved by the turbine generator units being provided with intake pipes through which the medium driving the turbine generator units can flow.

A further design variant of a turbine generator unit which can be used very advantageously is obtained if the turbine of a turbine generator unit has rotatably mounted turbine blades which, in the area of their outer ends, are connected by a force fit to an annular rotor of the generator of the turbine generator unit. The stator of the generator of the turbine generator unit is arranged concentrically around the rotor, and fixed against rotation in the module. As a result of the beneficial position of the center of gravity of such turbine generator units in relation to the fixing of the units themselves, but also in relation to anchoring the module and the load-holding arrangement, oscillations and tilting moments are in particular avoided, so that the construction of the module itself, and its guidance and mounting, can advantageously be designed to have smaller dimensions and therefore to be lighter. The central area of the turbine generator units, which is stressed by the tubular generator in conventional installations, is reduced in size in the solution according to the invention and can be used as an additional flow cross section, so that the efficiency of the turbine generator units may additionally be improved.

Optimum utilization of the energy available in the medium with a small space requirement results from the fact that the opening defined by the rotor and stator of the generator can be flowed through by the medium that drives the turbine.

Optimum efficiency of such turbine generator units is achieved by the turbine generator units being provided with inlet pipes which can be flowed through by the medium that drives the turbine generator units.

An improvement in the space requirement of the turbine generator units in the module results if the stators of adjacent turbine generator units of a module are arranged immediately beside one another and/or one above another.

The inflow area can be optimized further if the inlet pipes of adjacent turbine generator units are arranged immediately beside one another and/or one above another. The opening cross section of the inlet pipe in the area of the turbine is smaller than the opening cross section of the inlet pipe at the open end lying upstream of the turbine—in the flow direction—and the difference between these opening cross sections is generally greater than or equal to the sum of the cross section of the rotor and of the stator of the generator.

A particularly simple construction results from the fact that the inlet pipe in the area of the turbine or the generator is constructed as a housing in which the stator is anchored. Furthermore, it is advantageous to arrange guide vanes in the inlet pipes of the turbine generator units, by way of which vanes the turbine and the rotor of the generator are held.

Particularly simple and cost-effective equipment results from the fact that the annular space between rotor and stator of the generator is connected to a spatial section which is flowed through by the medium that flows through the turbine, and that this annular space can be flowed through by the medium. The annular space on both sides of the rotor or generator can preferably be flowed through over the entire circumference. In this case, the requirement for sealing is dispensed with, and the units or modules can be configured to be particularly cost-effective and largely maintenance-free and are additionally cooled by the medium flowing past. In this case, the stator and the rotor are intrinsically sealed against penetration of the medium flowing past and designed to be insulated electrically with respect to the medium.

In an alternative embodiment, the gap between rotor and stator of the generator is sealed with respect to the medium that drives the turbine, and the annular space between rotor and stator is filled with a gas, in particular air. In this case, it is advantageous to arrange the seal along the rotor, to be specific the seal can be fixed optionally to the rotating part or to the stator.

A further improvement with regard to the flexibility of such equipment results from the fact that the turbine is designed to be rotatable in both directions in order to generate power.

Furthermore, the efficiency of a module can be improved further by the alignment of the turbine blades with respect to the flow direction of the medium being adjustable.

In a preferred, particularly economic variant of the equipment according to the invention, the electrical output of the generator of an individual turbine generator unit is between approximately 100 kW and approximately 1000 kW, and preferably between approximately 200 kW and approximately 700 kW.

An installation can be produced and operated economically and efficiently in particular when the number of turbine generator units arranged one above another and/or beside one another is between approximately 5 and approximately 500, preferably between approximately 50 and approximately 250.

A further improvement with regard to the dimensioning results if the turbine generator units or the modules can be connected to a device for raising and lowering.

Likewise, it is quite particularly advantageous if the turbine generator units can be cooled, at least partially, by the medium flowing past, since then the cooling system can be designed to be smaller or, in the event of complete cooling by the medium flowing past, can even be dispensed with completely. The advantages associated with this with regard to construction, size, weight and costs, can be seen directly.

The invention also provides for an arrangement of equipment for generating electrical power from a flowing medium wherein the arrangement comprises a plurality of turbine generator units, at least some of the plurality of generator units being arranged at least one of one above another and one beside another, at least some of the plurality of generator units being connected to one another to form at least one module, and at least one of the plurality of generator units comprising a synchronous generator having permanent magnetic poles for excitation.

The flowing medium may be water. The permanent magnetic poles may be arranged on a rotor of the synchronous generator. The permanent magnetic poles may be arranged on a stator of the synchronous generator. The synchronous generator may be structured and arranged to produce an electrical output of between approximately 100 kW and approximately 1000 kW. The electrical output may be between approximately 200 kW and approximately 700 kW. The plurality of turbine generator units may be between approximately 5 and approximately 500 turbine generator units. The plurality of turbine generator units may be between approximately 50 and approximately 250 turbine generator units.

The plurality of turbine generator units may be connectable to a raising and lowering device. The at least one module may be connectable to a raising and lowering device. At least one of the plurality of turbine generator units may be adapted to be at least partly be cooled by the flowing medium. At least one of the plurality of turbine generator units may be a tubular turbine generator unit. The plurality of turbine generator units may be supported on at least one of associated frames and frame elements. The at least one module may be supported on at least one of a frame and a frame element. At least one of the plurality of turbine generator units may comprise a turbine rotor that is supported on at least one of a frame and a frame element.

At least one of the plurality of turbine generator units may comprise a substantially cylindrical turbine housing that is supported on at least one of a frame and a frame element. At least one of the plurality of turbine generator units may comprise guide vanes which support a turbine at a position upstream of a flow direction. The guide vanes may connect a turbine housing of the turbine to an inlet pipe. Each of the plurality of turbine generator units may comprise an intake pipe through which the flowing medium flows.

A turbine of at least one of the plurality of turbine generator units may comprise an annular rotor, a stator, and rotatably mounted turbine blades. The outer ends of the turbine blades may be connected by a force fit connection to the annular rotor. The stator may be concentrically arranged around the rotor and is non-rotatably mounted.

At least one turbine of the at least one module may comprise an annular rotor, a stator, and rotatably mounted turbine blades, wherein outer ends of the turbine blades are connected by a force fit connection to the annular rotor, and wherein the stator is concentrically arranged around the rotor and is non-rotatably mounted.

The synchronous generator may comprise an opening which is defined by a rotor and a stator, whereby the opening allows the flowing medium to flow through and drive a turbine.

Stators of at least some of the plurality of generator units may be arranged adjacent one another and at least one of one above another and one beside another.

The arrangement may further comprise inlet pipes connected to each of the plurality of turbine generator units, wherein each inlet pipe directs flowing medium to each turbine generator unit. The inlet pipes of adjacent turbine generator units may be arranged at least one of immediately beside one another and one above another. At least one of the inlet pipes may comprise a housing which is anchored to a stator. At least one of the inlet pipes may comprise a housing which fastened to a generator housing, and wherein the generator housing houses a stator. The arrangement may further comprise guide vanes connecting a turbine to at least one of the inlet pipes, wherein the guide vanes support the turbine and a rotor of a generator.

The arrangement may further comprise an annular space arranged between a rotor and a stator of the synchronous generator. The annular space may be structured and arranged to allow the flowing medium to flow through the annular space. The annular space may be arranged on both sides of the rotor. The annular space may comprise a sealed off space, whereby the flowing medium flowing through a turbine is prevented from entering the annular space.

The stator may be electrically insulated from the flowing medium. The arrangement may further comprise a gap between the rotor and the stator, wherein the annular space is filled with one of a gas and air. The arrangement may further comprise a seal arranged to provide sealing for the rotor. The arrangement may further comprise a seal arranged to provide sealing for the stator. The arrangement may further comprise a seal fixed to the rotor. The arrangement may further comprise a seal fixed to the stator.

The turbine generator unit that comprises the synchronous generator may include a turbine which is structured and arranged to rotate in opposite directions while generating power.

The turbine generator unit that comprises the synchronous generator may include at least one of turbine blades with adjustable alignment and guide vanes which can adjust flow of the flowing medium.

The invention also provides for an installation for generating electrical power from a flowing medium, wherein the installation comprises a dam structure, a plurality of turbine generator units arranged at least one of one above another and one beside another, the plurality of turbine generator units being connected to one another, at least some of the plurality of turbine generator units forming at least one module, the at least one module being supported on the dam structure, and each of the plurality of the turbine generator units comprising a synchronous generator having permanent magnetic poles for excitation.

The flowing medium may comprise water. The at least one module may comprise a plurality of modules arranged besides one another and supported on the dam structure. The dam structure may comprise a plurality of dam piers, whereby the flowing medium is allowed to flow between the dam piers.

The installation may further comprise a lifting device structured and arranged to raise and lower the at least one module, whereby the at least one module is supported and guided between two adjacent piers. The installation may further comprise a lifting device structured and arranged to raise and lower the at least one module.

The invention also provides for a method of reconfiguring a dam structure which at least temporarily stores a free-flowing medium into an installation for generating electrical power, wherein the dam structure comprises at least one element for storing the free-flowing medium, and wherein the method comprises removing a removable arrangement from an area of the dam structure and installing a module in the area, wherein the module comprises a plurality of turbine generator units arranged at least one of beside one another and one above another, and wherein each of the plurality of generator units comprises a synchronous generator with permanent magnetic excitation.

The method may further comprise, prior to the removing, raising and lowering the removable arrangement. The removing may comprise raising the removable arrangement with a lifting device. The installing may comprise raising and lowering the module with a lifting device. The area may be located within the dam structure.

The method may further comprise connecting the plurality of turbine generator units to a power supply network via a line for carrying away the electrical power generated by the plurality of turbine generator units. The method may further comprise removing the module from the area and reinstalling the removable arrangement in the area. The at least one element for storing the free-flowing medium may comprise a weir.

The invention also provides for a method of generating electrical power from a flowing medium, wherein the method comprises forming a module by arranging a plurality of turbine generator units at least one of one above another and one beside another, connecting the plurality of turbine generator units to one another, allowing the flowing medium to flow through each of the plurality of turbine generator units at the same time, causing turbines of the plurality of turbine generator units to rotate, generating electrical power with generators of the turbine generator units, and conducting the electrical power away from the generators via an electrical transmission line, wherein each turbine generator unit comprises a rotor having permanent magnetic poles and a non-rotatably mounted stator arranged concentrically around the rotor.

The invention also provides for an arrangement for generating electrical power from a flowing medium, wherein the arrangement comprises a plurality of turbine generator units, the plurality of generator units being connected to one another to form a module, at least one of the plurality of generator units comprising a turbine, an annular rotor rotated by the turbine, an annular non-rotatably mounted stator, and a conical inlet pipe, the turbine being supported within the conical inlet pipe via guide vanes, and the stator being arranged within an annular space defined by the annular rotor and a generator housing.

The invention also provides for an arrangement for generating electrical power from a flowing medium, wherein the arrangement comprises a plurality of turbine generator units, the plurality of generator units being connected to one another to form a module, at least one of the plurality of generator units comprising a turbine, a rotor rotated by the turbine, turbine blades, an annular non-rotatably mounted stator, and a conical inlet pipe having an inlet opening, the turbine being connected to the conical inlet pipe via guide vanes, and the turbine blades rotating within the conical inlet pipe between the inlet opening and the guide vanes.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
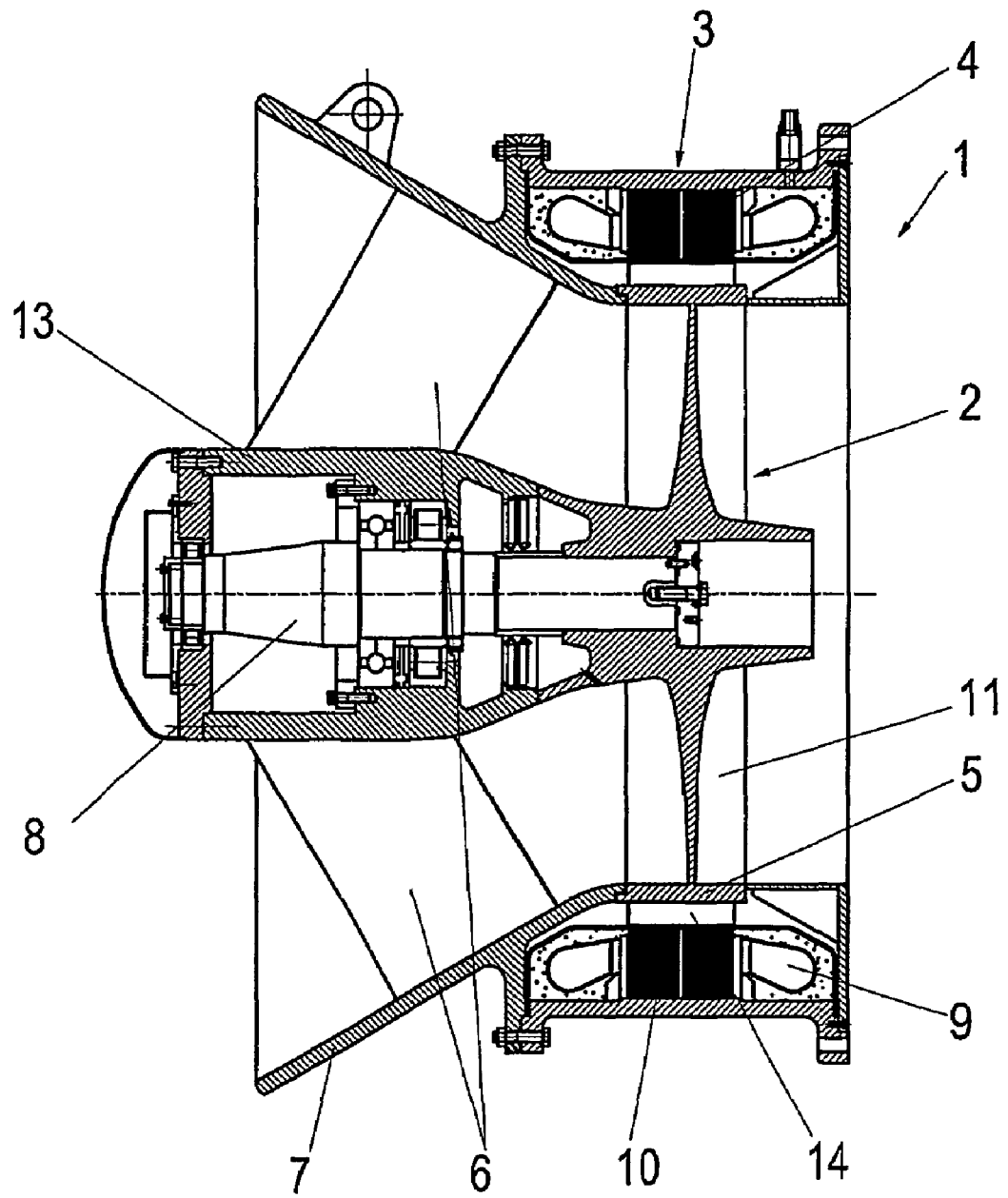
FIG. 1 shows a section through an exemplary embodiment of a turbine generator unit of so called Straflo design.

The turbine generator unit 1 shown in FIG. 1 has a turbine 2 with turbine blades 11. The blades 11 are connected by a force fit to one another and to a shaft 8. The shaft 8 is rotatably mounted by way of, e.g., rolling-contact, sliding and/or ball bearings, in a pear-shaped bearing housing 13 of the turbine generator unit 1. The housing 13 is sealed against the medium, for example water, and allows the medium to flow around it. The bearing housing 13 is fixed to a conical inlet pipe 7 by way of guide vanes 6.

A generator 3 is located in the area of the ends of the turbine blades 11. The generator 3 includes an annular rotor 5. The annular rotor 5 is connected by, e.g., a force fit connection, to the turbine blades 11. An annular stator 4 forms part of the generator 3 and is concentrically around the rotor 5. The stator 4 fixed against rotation and, in the exemplary embodiment shown, is anchored in a section of the inlet pipe 7 constructed as a housing. The rotor 5 of the generator 3 has permanent magnet poles, not specifically illustrated here, which serve as excitation for the generator 3. The stator 4 comprises, in a manner sufficiently well known, a lamination pack 10 and a windings 9.

An annular gap 14 is arranged between the rotor 5 and the stator 4. The annular gap inter space 14, in the present exemplary embodiment, is filled with gas, for example, air. The rotor 5 is sealed off with respect to the medium flowing through the inlet pipe 7. This sealing can take place, for example, by way of a seal arranged between the end faces of the rotor 5 and the opposite end face of the housing formed by the inlet pipe 7. Alternatively, the gap interspace 14 can be designed to allow the medium which flows through the turbine 2 to also flow through and/or to enter the gap 14. In this way, the gap 14 can be continuously filled with the medium, for example water, in operation. For this purpose, it is of course necessary for the electrical parts of the generator 3 to be designed so as to be insulated with respect to the medium.

Similar turbines with generators are already known for applications as individual stationary units with a comparatively high output class. A turbine generator set of this type is described in U.S. Pat. No. 4,046,403, U.S. Pat. No. 4,123,666 and U.S. Pat. No. 4,464,580, the disclosure of these documents is hereby expressly incorporated by reference in their entireties.

Figure 2:
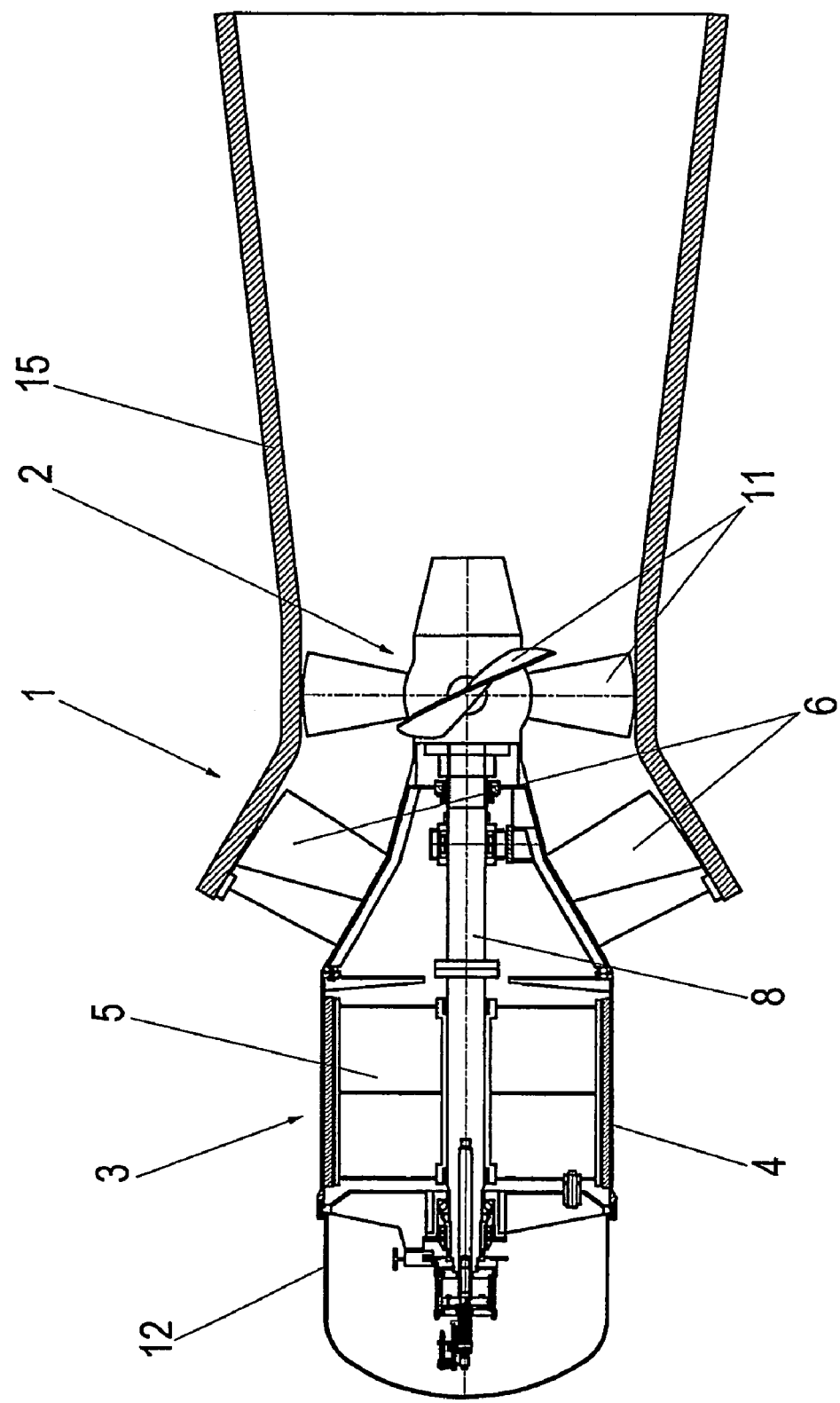
FIG. 2 shows a section through an exemplary embodiment of a turbine generator unit of tubular turbine design.

FIG. 2 now shows a further exemplary embodiment of a turbine generator unit 1 having a permanent-magnet excited generator 3. In this example, the generator 3 is arranged in a pear-shaped generator housing 12. The rotor 5 of the generator 3 is connected by a form fit to a shaft 8. The shaft 8 is rotatably mounted by way of, e.g., rolling-contact, sliding and/or ball bearings, in the generator housing 12. The generator 3 is driven by a turbine 2. For this purpose, a turbine 2 with turbine blades 11, which is set rotating by the medium flowing past, is arranged with a form fit at the end of the shaft 8 facing away from the generator 3 in the flow direction.

The rotor 5 has permanent magnet poles, not specifically illustrated, which serve as excitation for the generator 3. The stator 4 is fixed in a fixed location directly on the inner wall of the generator housing 12. Here, the generator 3 is cooled exclusively via the medium flowing past.

The generator housing 12 is sealed off against the medium, for example water, flowing around it, and is fixed to a conical intake pipe 15 (7 in FIG. 1) by way of guide vanes 6.

Figure 3:
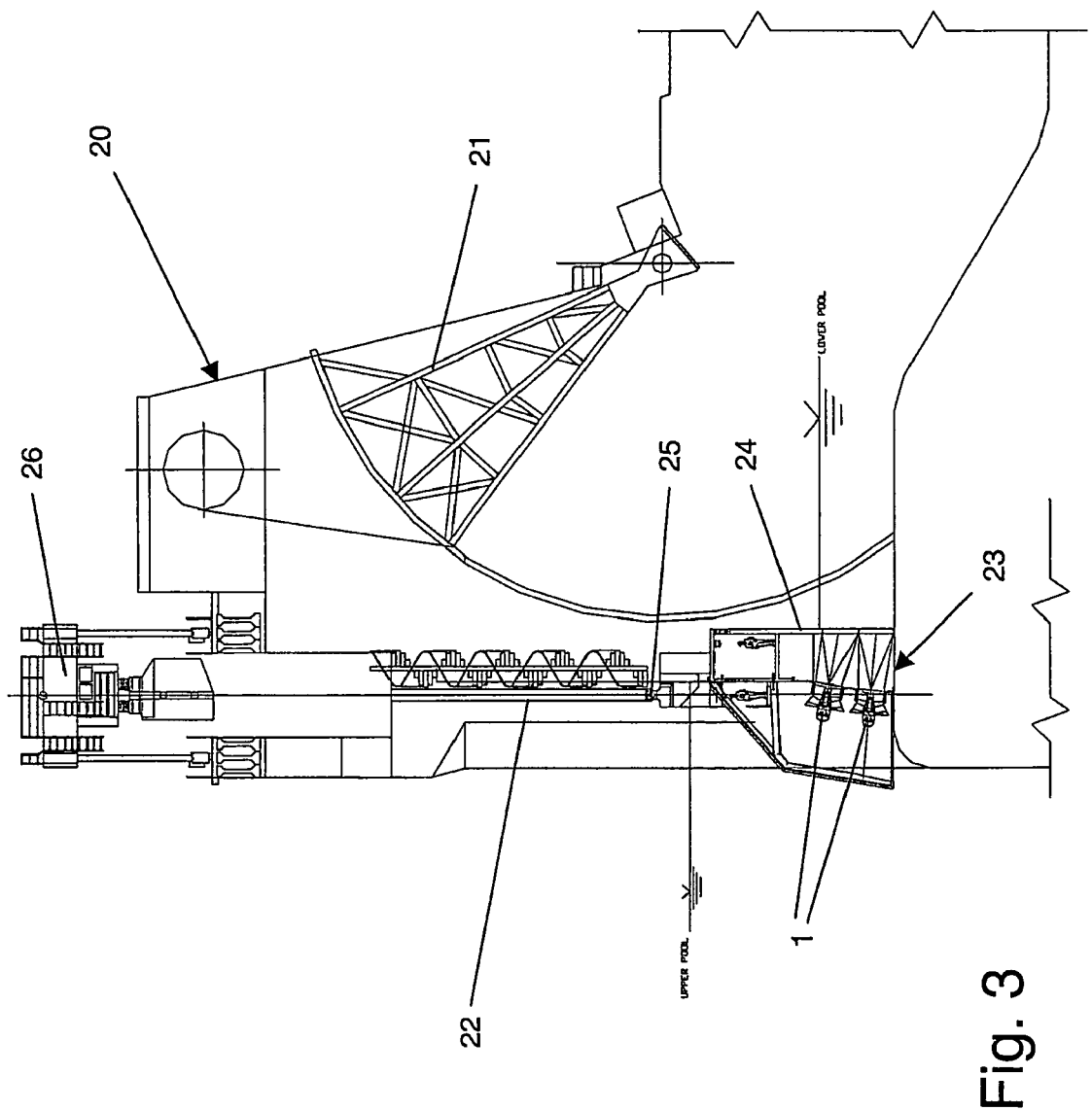
FIG. 3 shows a section through a hydroelectric installation having an arrangement of a plurality of turbine generator units.

FIG. 3 shows an installation for generating electrical power from a flowing medium, specifically water, having a dam structure 20. By way of the dam structure 20, an area with a higher water level (UPPER POOL) can be separated from an area with a lower water level (LOWER POOL). A weir 21 which can be raised and lowered by being pivoted about a horizontal axis. The water is able to flow from the area with the higher water level into the area with the lower water level when the weir 21 is in the raised position. The flow is prevented when the weir 21 is in the lowered position.

Furthermore, on both sides of the weir 21, the dam structure 20 has adjacent vertical lateral guides 22. These are used to guide and support turbine generator units 1 which, in the present case, are arranged beside one another and one above another. They are also combined in a matrix form so as to form a module 23. The module 23, in the exemplary embodiment shown, is integrated in a frame 24 which is additionally equipped to accommodate further elements, such as a rake, service equipment and the like. In a departure from the present exemplary embodiment, however, the individual turbine generator units 1 can also be arranged in the form of a honeycomb or in any other desired structure. They can also, for example, be arranged offset in the flow direction, etc. Thus, the turbine generator units 1 can be arranged in a so-called Straflo design and may utilize units of the type shown in, e.g., FIG. 1. Of course, the arrangements/installations are not limited to the unit shown in FIG. 1, and may also utilize any other desired turbine generator unit, such as a tubular turbine unit shown in FIG. 2.

The module 23 can be moved with a load lifting system 25 for a crane 26. This system is arranged on the dam structure 20. This lifting arrangement allows the module 23 to be raised and lowered. In this way, it is possible for all the turbine generators units 1 of a module 23 (in the lowered state of the module) to generate electrical power from the water flowing through the turbines.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed:

1. An arrangement of equipment for generating electrical power from a flowing medium, the arrangement comprising:
    a plurality of turbine generator units arranged in at least one module;
    each of the plurality of turbine generator units in the at least one module being connected to one another, the turbine generator units are in a fixed arrangement in the at least one module, and each unit is adjacent at least one of the other of the turbine generator units in the at least one module;
    at least one of the turbine generator units being arranged above another of the turbine generator units in the at least one module, and at least one turbine generator unit arranged beside another of the turbine generator units in the at least one module;
    the at least one module being structured and arranged to be movable as a unit;
    at least one of the plurality of turbine generator units of the at least one module comprising a synchronous generator having permanent magnetic poles for excitation, wherein the permanent magnetic poles are arranged on a periphery of a rotor of the at least one turbine generator units, and
    a stator of the synchronous generator is adjacent the perihery of the rotor and mounted to a conical inlet pipe for the turbine generator unit with the permanent magnetic poles, wherein the inlet pipe has an inlet area extending radially beyond an outer surface of the synchronous generator.

2. The arrangement of claim 1, wherein the flowing medium is water.

3. An arrangement of equipment for generating electrical power from a flowing medium, the arrangement comprising:
    a plurity of trubine generator units arranged in at least one module;
    each of the plurality of turbine generator units in the at least one module being connected to one another, the turbine generator units are in a fixed arrangement in the at least one module, and each unit is adjacent at least one of the other of the turbine generator units in the at least one module;
    at least one of the turbine generator units being arranged above another of the turbine generator units in the at least one module, and at least one turbine generator unit arranged beside another of the turbine generator units in the at least one module;
    the at least one module being structured and arranged to be movable as a unit; and
    at least one of the plurality of turbine generator units of the at least one module comprising a synchrounous generator having permanent magnetic poles for excitation,
    wherein the permanent magnetic poles are arranged on a rotor of the synchronous generator, wherein the turbine generator unit with the permanent magnetic poles is arranged on a periphery of the rotor and
    a stator of the synchronous generator is adjacent the periphery of the rotor and mounted to a conical inlet pipe for the turbine generator unit with the permanent magnetic poles, wherein the inlet pipe has an inlet area extending radially beyond an outer surface of the synchronous generator.

4. The arrangement of claim 1, wherein the permanent magnetic poles are arranged on a stator of the synchronous generator.

5. The arrangement of claim 1, wherein the synchronous generator is structured and arranged to produce an electrical output of between approximately 100 kW and approximately 1000 kW.

6. The arrangement of claim 5, wherein the electrical output is between approximately 200 kW and approximately 700 kW.

7. The arrangement of claim 1, wherein the plurality of turbine generator units is between approximately 5 and approximately 500 turbine generator units.

8. The arrangement of claim 7, wherein the plurality of turbine generator units is between approximately 50 and approximately 250 turbine generator units.

9. The arrangement of claim 1, wherein the plurality of turbine generator units are connectable to a raising and lowering device.

10. The arrangement of claim 1, wherein the at least one module is connectable to a raising and lowering device.

11. The arrangement of claim 1, wherein at least one of the plurality of turbine generator units is adapted to be at least partly be cooled by the flowing medium.

12. The arrangement of claim 1, wherein at least one of the plurality of turbine generator units is a tubular turbine generator unit.

13. The arrangement of claim 1, wherein the plurality of turbine generator units are supported on at least one of associated frames and frame elements.

14. The arrangement of claim 1, wherein the at least one module is supported on at least one of a frame and a frame element.

15. The arrangement of claim 1, wherein at least one of the plurality of turbine generator units comprises a turbine rotor that is supported on at least one of a frame and a frame element.

16. The arrangement of claim 1, wherein at least one of the plurality of turbine generator units comprises a substantially cylindrical turbine housing that is supported on at least one of a frame and a frame element.

17. The arrangement of claim 1, wherein at least one of the plurality of turbine generator units comprises guide vanes which support a turbine at a position upstream of a flow direction.

18. The arrangement of claim 17, wherein the guide vanes connect a turbine housing of the turbine to an inlet pipe.

19. The arrangement of claim 1, wherein each of the plurality of turbine generator units comprise an intake pipe through which the flowing medium flows.

20. The arrangement of claim 1, wherein a turbine of at least one of the plurality of turbine generator units comprises an annular rotor, a stator, and rotatably mounted turbine blades having blade tips attached to the annular rotor.

21. The arrangement of claim 20, wherein outer ends of the turbine blades are connected by a force fit connection to the annular rotor.

22. The arrangement of claim 20, wherein the stator is concentrically arranged around the rotor and is non-rotatably mounted.

23. The arrangement of claim 1, wherein at least one turbine of the at least one module comprises an annular rotor, a stator, and rotatably mounted turbine blades, wherein outer ends of the turbine blades are connected by a force fit connection to the annular rotor, and wherein the stator is concentrically arranged around the rotor and is non-rotatably mounted.

24. The arrangement of claim 23, wherein the at least one turbine generator unit of the at least one module comprises an annular gap between the annular rotor and the stator, whereby the annular gap allows the flowing medium to flow therethrough.

25. The arrangement of claim 1, wherein stators of at least some of the plurality of turbine generator units are arranged adjacent one another and at least one of one above another and one beside another.

26. The arrangement of claim 1, further comprising inlet pipes connected to each of the plurality of turbine generator units, wherein each inlet pipe directs flowing medium to each turbine generator unit.

27. The arrangement of claim 26, wherein the inlet pipes of adjacent turbine generator units are arranged at least one of immediately beside one another and one above another.

28. The arrangement of claim 26, wherein at least one of the inlet pipes comprises a housing which is anchored to a stator.

29. The arrangement of claim 26, wherein at least one of the inlet pipes comprises a housing which fastened to a generator housing, and wherein the generator housing houses a stator.

30. The arrangement of claim 26, further comprising guide vanes connecting a turbine to at least one of the inlet pipes, wherein the guide vanes support the turbine and a rotor of a generator.

31. The arrangement of claim 1, further comprising an annular gap arranged between a rotor and a stator of the synchronous generator.

32. The arrangement of claim 31, wherein the annular gap is structured and arranged to allow the flowing medium to flow through the annular space.

33. The arrangement of claim 32, wherein the annular gap is arranged on both sides of the rotor.

34. The arrangement of claim 31, wherein the annular gap comprises a sealed off space, whereby the flowing medium flowing through a turbine is prevented from entering the annular space.

35. The arrangement of claim 31, wherein the stator is electrically insulated from the flowing medium.

36. The arrangement of claim 31, further comprising an annular gap between the rotor and the stator, wherein the annular space is filled with one of a gas and air.

37. The arrangement of claim 31, further comprising a seal arranged to provide sealing for the rotor.

38. The arrangement of claim 31, further comprising a seal arranged to provide sealing for the stator.

39. The arrangement of claim 31, further comprising a seal fixed to the rotor.

40. The arrangement of claim 31, further comprising a seal fixed to the stator.

41. The arrangement of claim 31, wherein the turbine generator unit that comprises the synchronous generator includes a turbine which is structured and arranged to rotate in opposite directions while generating power.

42. The arrangement of claim 1, wherein the turbine generator unit that comprises the synchronous generator includes at least one of turbine blades with adjustable alignment and guide vanes which can adjust flow of the flowing medium.

43. An arrangement for generating electrical power from a flowing medium, the arrangement comprising:
   a plurality of turbine generator units;
   the plurality of turbine generator units in a fixed arrangement in a module in which each unit is adjacent at least one of the other of the turbine generator units and at least one unit is directly above another unit;
   at least one of the plurality of turbine generator units comprising a rotor including turbine blades, an annular non-rotatably mounted stator, and a conical inlet pipe having an inlet opening;
   the at least one of the plurality of turbine generator units comprising a synchronous generator having magnetic poles for excitation, wherein the magnetic poles are arranged on a periphery of the rotor and the stator is adjacent the periphery of the rotor wherein the stator is mounted to an external portion of the conical inlet pipe;

the at least one of the plurality of turbine generator units connected to the conical inlet pipe, wherein the conical inlet pipe extends radially outward beyond a maximum outer surface of the synchronous generator, and the turbine blades rotate within the conical inlet pipe.

44. The arrangement of claim 1, wherein each of the plurality of turbine generator units of the at least one module comprises a synchronous generator having permanent magnetic poles for excitation.

45. The arrangement of claim 43 wherein the rotor includes an annular ring attached to tips of the turbine blades and having an outer surface supporting permanent magnets.

46. The arrangement of claim 43 further comprising an rotating axial shaft supporting the rotor, wherein the axial shaft is supported by guide vanes attached to the conical inlet.

47. The arrangement of claim 43 further comprising an axial rotating shaft supporting the rotor, a stationary housing supporting the rotor and inlet guide vanes extending between the housing and the conical inlet pipe.

48. The arrangement of claim 43 wherein the magnetic poles are permanent magnetic poles.

49. An arrangement for generating electrical power from a flowing medium, the arrangement comprising:

a plurality of turbine generator units mounted in a module wherein the units are in a fixed arrangement in which each unit is adjacent at least one other unit and at least one unit is directly above another unit, and each of the turbine generator units including a rotor with at least one turbine blade, a synchronous generator having magnetic poles for excitation in an annular stator arranged around a periphery of the rotor, and a conical inlet pipe having an inlet opening, wherein the at least one turbine blade rotates within the conical inlet pipe and the conical inlet pipe extends radially outward beyond a maximum outer surface of the synchronous generator and the stator is mounted to an external portion of the conical inlet pipe.

* * * * *